United States Patent
Lho et al.

(10) Patent No.: US 12,528,713 B2
(45) Date of Patent: Jan. 20, 2026

(54) METHOD OF PREPARING POSITIVE ELECTRODE ACTIVE MATERIAL FOR LITHIUM SECONDARY BATTERY AND POSITIVE ELECTRODE ACTIVE MATERIAL PREPARED THEREBY

(71) Applicant: LG Energy Solution, Ltd., Seoul (KR)

(72) Inventors: Eun Sol Lho, Daejeon (KR); Gi Beom Han, Daejeon (KR); Jong Woo Kim, Daejeon (KR); Wang Mo Jung, Daejeon (KR); Sang Min Park, Daejeon (KR); Sang Wook Lee, Daejeon (KR); Seul Ki Kim, Daejeon (KR); Hyeong Il Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/573,109

(22) PCT Filed: Nov. 2, 2022

(86) PCT No.: PCT/KR2022/017015
§ 371 (c)(1),
(2) Date: Dec. 21, 2023

(87) PCT Pub. No.: WO2023/096201
PCT Pub. Date: Jun. 1, 2023

(65) Prior Publication Data
US 2024/0270603 A1    Aug. 15, 2024

(30) Foreign Application Priority Data
Nov. 24, 2021  (KR) .................. 10-2021-0163458

(51) Int. Cl.
*C01G 53/50*  (2025.01)
*H01M 4/02*  (2006.01)
(Continued)

(52) U.S. Cl.
CPC ............ *C01G 53/50* (2013.01); *H01M 4/505* (2013.01); *H01M 4/525* (2013.01);
(Continued)

(58) Field of Classification Search
CPC ................. H01M 4/525; C01G 53/50–506
See application file for complete search history.

(56) References Cited

U.S. PATENT DOCUMENTS 10,199,649 B2   2/2019   Beck et al.
10,777,815 B2   9/2020   Kanada et al.
(Continued)

FOREIGN PATENT DOCUMENTS

CN        105070896 A    11/2015
CN        110268561 A     9/2019
(Continued)

OTHER PUBLICATIONS

International Search Report for Application No. PCT/KR2022/017015 mailed Feb. 10, 2023, pp. 1-3.
(Continued)

*Primary Examiner* — Robert S Carrico
(74) *Attorney, Agent, or Firm* — Lerner David LLP (57) ABSTRACT

A method of preparing a positive electrode active material for a lithium secondary battery and a positive electrode active material prepared thereby. T the preparation method includes a first step of preparing a lithium transition metal oxide by mixing a lithium raw material and a transition metal precursor containing 70 mol % or more of nickel based on the total number of moles of transition metals and sintering the mixture; and a second step of washing the lithium transition metal oxide with hot water of more than 90° C., wherein, after the second step, a result of EELS analysis of a particle surface of the lithium transition metal oxide satisfies Equation 1.

3 Claims, 2 Drawing Sheets

(51) Int. Cl.
  *H01M 4/505* (2010.01)
  *H01M 4/525* (2010.01)
  *H01M 10/052* (2010.01)
  *H01M 10/42* (2006.01)

(52) U.S. Cl.
  CPC ..... *H01M 10/052* (2013.01); *H01M 10/4235* (2013.01); *C01P 2006/40* (2013.01); *H01M 2004/028* (2013.01)

(56) References Cited

U.S. PATENT DOCUMENTS

| | | |
|---|---|---|
| 2008/0268347 A1 | 10/2008 | Ohzuku et al. |
| 2014/0056797 A1 | 2/2014 | Kabe et al. |
| 2015/0243970 A1 | 8/2015 | Choi et al. |
| 2016/0006025 A1 | 1/2016 | Sun |
| 2016/0118656 A1 | 4/2016 | Nakayama et al. |
| 2016/0211517 A1 | 7/2016 | Beck et al. |
| 2017/0358799 A1* | 12/2017 | Gunji .................. H01M 4/62 |
| 2018/0323428 A1 | 11/2018 | Nakayama et al. |
| 2019/0131624 A1 | 5/2019 | Choi et al. |
| 2019/0181444 A1 | 6/2019 | Gunji et al. |
| 2019/0288285 A1 | 9/2019 | Kim et al. |
| 2020/0303734 A1 | 9/2020 | Arimura et al. |
| 2020/0350581 A1 | 11/2020 | Kim et al. |
| 2020/0373572 A1 | 11/2020 | Gunji et al. |
| 2021/0130189 A1 | 5/2021 | Chen et al. |
| 2021/0280866 A1 | 9/2021 | Cho et al. |
| 2021/0328213 A1 | 10/2021 | Kim et al. |
| 2022/0190326 A1 | 6/2022 | Eom et al. |
| 2024/0079585 A1 | 3/2024 | Cho et al. |

FOREIGN PATENT DOCUMENTS

| | | | | |
|---|---|---|---|---|
| CN | 112599761 A | * | 4/2021 | ........ H01M 10/0567 |
| JP | 2003068293 A | | 3/2003 | |
| JP | 2008258160 A | | 10/2008 | |
| JP | 2011119096 A | | 6/2011 | |
| JP | 2013065467 A | | 4/2013 | |
| JP | 2013065468 A | | 4/2013 | |
| JP | 2016119190 A | | 6/2016 | |
| JP | 2017216243 A | | 12/2017 | |
| KR | 20140108615 A | | 9/2014 | |
| KR | 20150101873 A | | 9/2015 | |
| KR | 20160139098 A | | 12/2016 | |
| KR | 20170100534 A | | 9/2017 | |
| KR | 20170105307 A | | 9/2017 | |
| KR | 20200036796 A | | 4/2020 | |
| KR | 20200041978 A | | 4/2020 | |
| KR | 20200127910 A | | 11/2020 | |
| KR | 20200131179 A | | 11/2020 | |
| KR | 102199867 B1 | | 1/2021 | |
| WO | 2012147767 A1 | | 11/2012 | |
| WO | 2014189108 A1 | | 11/2014 | |

OTHER PUBLICATIONS

Search Report dated May 20, 2024 from the Office Action for Chinese Application No. 202280043383.3 issued May 21, 2024, 2 pages.
Extended European Search Report including Written Opinion for Application No. 22898883.8 dated Jul. 23, 2024, pp. 1-7.
Yan, L. et al., "Surface Chemistry and Modification on Ni-rich $LiNi_{1-x}M_xO_2$ Cathode Materials for Li-ion Batteries", May 2017, pp. 12-13, vol. 45, No. 10. [Providing English Abstract Only].

* cited by examiner

METHOD OF PREPARING POSITIVE ELECTRODE ACTIVE MATERIAL FOR LITHIUM SECONDARY BATTERY AND POSITIVE ELECTRODE ACTIVE MATERIAL PREPARED THEREBY

CROSS-REFERENCE TO RELATED APPLICATIONS

The present application is a national phase entry under of 35 U.S.C. 371 International Application No. PCT/KR2022/017015, filed on Nov. 2, 2022, which claims priority to Korean Patent Application No. 10-2021-0163458, filed on Nov. 24, 2021, the disclosures of which are incorporated by reference herein.

TECHNICAL FIELD

The present disclosure relates to a method of preparing a positive electrode active material for a lithium secondary battery, a positive electrode active material prepared thereby, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide'), in which a portion of nickel (Ni) is substituted with cobalt (Co) and manganese (Mn), has been developed. However, since capacity characteristics of conventionally developed NCM-based lithium composite transition metal oxides are insufficient, the NCM-based lithium composite transition metal oxides have been limited in application.

In order to address such limitation, studies have recently been made to increase a nickel (Ni) content in the NCM-based lithium composite transition metal oxides. However, with respect to a high-nickel (high-Ni) positive electrode active material having a high nickel content, there is a problem in that a large amount of gas is generated during charge and discharge due to high reactivity of nickel and instability of a lattice structure is increased due to cation mixing and oxygen desorption to cause structural collapse.

Thus, development of a technique to improve structural stability by applying coating or doping to the NCM-based lithium composite transition metal oxide has been actively conducted. However, since it is difficult to achieve an effect of uniformly improving the structural stability on both lattice and surface of the oxide only by the coating or doping, there is a need to develop a technique to solve this.

DISCLOSURE OF THE INVENTION

Technical Problem

An aspect of the present invention provides a positive electrode active material which may contribute to reduced amounts of leakage current and gas generation of a lithium secondary battery due to high structural stability while being able to achieve high capacity due to a high nickel content.

Technical Solution

The present disclosure provides a method of preparing a positive electrode active material for a lithium secondary battery which includes:
  a first step of preparing a lithium transition metal oxide by mixing a lithium raw material and a transition metal precursor containing 70 mol % or more of nickel based on the total number of moles of transition metals and sintering the mixture; and
  a second step of washing the lithium transition metal oxide with hot water of more than 90° C.,
  wherein, after the second step, a result of EELS analysis of a particle surface of the lithium transition metal oxide satisfies Equation 1.

$$I(853 \text{ eV})/I(855.5 \text{ eV}) \geq 1 \quad \text{[Equation 1]}$$

wherein, in Equation 1,
I (853 eV) is a peak intensity appearing near 853 ev, and
I (855.5 eV) is a peak intensity appearing near 855.5 eV.

Also, the present disclosure provides a positive electrode active material for a lithium secondary battery which includes a lithium transition metal oxide containing 70 mol % or more of nickel based on the total number of moles of transition metals,
  wherein a result of EELS analysis of a particle surface of the lithium transition metal oxide satisfies Equation 1.

Furthermore, the present disclosure provides a positive electrode including a positive electrode active material layer which includes the positive electrode active material for a lithium secondary battery according to the present technology.

Also, the present disclosure provides a lithium secondary battery including the positive electrode according to the present technology.

Advantageous Effects

A method of preparing a positive electrode active material according to the present technology provides a method capable of controlling surface reactivity by adjusting washing conditions during synthesis of a high-nickel (high-Ni) positive electrode active material, and, in a case in which a positive electrode active material prepared through this is used in a lithium secondary battery, amounts of leakage current and gas generated under high-voltage or high-temperature conditions may be reduced.

MODE FOR CARRYING OUT THE INVENTION

Hereinafter, the present invention will be described in more detail to allow for a clearer understanding of the present invention.

The expression "primary particle" in the present disclosure means a particle unit in which a grain boundary does not exist in appearance when observed by using a scanning electron microscope with a field of view of 5,000 times to 20,000 times, and the expression "secondary particle" means a particle formed by aggregation of a plurality of primary particles.

The expression "result of EELS analysis" in the present disclosure means an EELS spectrum obtained by Electron Energy-Loss Spectroscopy (EELS). The EELS spectrum may be obtained using a high resolution-transmission electron microscope (HR-TEM), wherein a horizontal axis represents an energy-loss region, and a vertical axis represents a peak intensity.

In Equation 1 of the present disclosure, the expression "near 853 eV" means a region of 853±0.5 eV, and the expression "near 855.5 eV" means a region of 855.5±0.5 eV.

The expression "particle surface" in the present disclosure means a region within a distance of 100 nm from the surface of the particle in a central direction.

Method of Preparing Positive Electrode Active Material

First, a method of preparing a positive electrode active material according to the present technology will be described.

The method of preparing a positive electrode active material for a lithium secondary battery according to an embodiment of the present invention includes a first step of preparing a lithium transition metal oxide by mixing a lithium raw material and a transition metal precursor containing 70 mol % or more of nickel based on the total number of moles of transition metals and sintering the mixture; and a second step of washing the lithium transition metal oxide with hot water of more than 90° C., wherein, after the second step, a result of EELS analysis of a particle surface of the lithium transition metal oxide satisfies Equation 1 below.

$$I(853 \text{ eV})/I(855.5 \text{ eV}) \geq 1 \quad \text{[Equation 1]}$$

In Equation 1,
I (853 eV) is a peak intensity appearing near 853 ev, and
I (855.5 eV) is a peak intensity appearing near 855.5 eV.

A high-nickel (high Ni) positive electrode active material with an amount of Ni among transition metals of 70 mol % or more has an advantage of being able to achieve high capacity, but an amount of gas generated is not only increased due to a side reaction with an electrolyte solution during charge and discharge, but it also undergoes a lot of change in lattice constant, that is, a lot of change in volume of a unit lattice. Particularly, in a case in which the amount of the Ni is greater than 80 mol %, a phase transition occurs near 4.2 V and a phenomenon occurs in which the lattice contracts rapidly. This change in volume causes generation of cracks in the active material, and the cracks thus generated may cause generation of voids in the active material to degrade performance of a battery.

Specifically, in a case in which there are many $Ni^{3+}$ ions, which are less stable than $Ni^{2+}$, on surfaces of transition metal oxide particles, since the $Ni^{3+}$ ions cause a side reaction with an electrolyte to accelerate decomposition of the electrolyte, lifetime of the battery is not only reduced, but release of oxygen from a crystal structure may also be caused. Since the released oxygen oxidizes the electrolyte to increase the amount of gas generated, it becomes a cause of deterioration in battery stability and, particularly, this problem is further intensified under high-temperature and high-voltage conditions.

Thus, the present inventors aimed at suppressing surface reactivity of the positive electrode active material as much as possible, and paid attention to the fact that $Ni^{2+}$ is easily exposed on surfaces of both a primary particle and a secondary particle because lithium impurities present on the surface of the primary particle as well as the surface of the secondary particle are washed away in a case in which temperature of a washing liquid is increased in a washing step which is performed after precursor sintering during synthesis of the positive electrode active material. $Ni^{2+}$ combines with oxygen (O) on the surface to form a highly stable NiO phase, wherein, since the NiO phase was formed even on the surface of the primary particle according to the present technology, it was confirmed that the surface reactivity may be effectively reduced. That is, since the surface of the primary particle as well as the surface of the secondary particle exists in a reduced state, a phenomenon, in which oxygen is released by reduction of nickel ions, may be prevented, and thus, it has been found that a phenomenon, in which the released oxygen reacts with the electrolyte to change surface properties of an electrode or generate gas, may be reduced. Also, it has been confirmed that there is an effect of reducing a leakage current value during continuous charge and discharge due to surface stabilization.

1) First Step

First, a transition metal precursor and a lithium raw material are mixed and sintered to prepare a lithium transition metal oxide.

In this case, a commercially available precursor, such as nickel-cobalt-manganese-based hydroxide, may be purchased and used as the transition metal precursor, or the transition metal precursor may be prepared according to a method of preparing a precursor which is known in the art. Specifically, the transition metal precursor used in the present technology is a transition metal hydroxide containing nickel, cobalt, and manganese and containing 70 mol % or more of nickel based on the total number of moles of total transition metals, and may preferably be a nickel cobalt manganese hydroxide containing 80 mol % or more of nickel. When the amount of the nickel in the transition metal precursor satisfies the above range, high capacity characteristics may be achieved.

Specifically, the transition metal precursor may be represented by Formula 2 below.

$$Ni_{b1}Co_{c1}Mn_{d1}Q_{e1}(OH)_2 \quad \text{[Formula 2]}$$

In Formula 2, b1, c1, d1, and e1 respectively satisfy $0.7 \leq b1 \leq 1.0$, $0 < c1 \leq 0.25$, $0 < d1 \leq 0.25$, $0 \leq e1 \leq 0.1$, and $b1+c1+d1+e1=1.0$, and Q is at least one selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

Preferably, Q may be at least one selected from the group consisting of Al, Mg, V, Ti, and Zr.

In an embodiment of the present invention, b1, c1, d1 and e1 in Formula 2 may satisfy $0.8 \leq b1 < 1.0$, $0 < c1 \leq 0.15$, $0 < d1 \leq 0.15$ and $0 e1 \leq 0.05$, respectively, and may more preferably satisfy $0.85 \leq b1 < 1.0$, $0 < c1 \leq 0.10$, $0 < d1 \leq 0.10$, and $0 \leq e1 \leq 0.03$, respectively.

The transition metal precursor, for example, may be prepared by a co-precipitation reaction while adding a transition metal aqueous solution, an ammonium cationic complexing agent, and a basic compound to a reactor and stirring.

The transition metal aqueous solution may be prepared by dissolving transition metal-containing raw materials in a solvent, such as water, and, for example, may be prepared by dissolving a nickel-containing raw material, a cobalt-containing raw material, and a manganese-containing raw material in water. Also, if necessary, the transition metal aqueous solution may further include a Q metal-containing raw material.

The transition metal-containing raw material may be acetic acid salts, carbonates, nitrates, sulfates, halides, sulfides, or oxides of transition metal. Specifically, the nickel-containing raw material, for example, may be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a nickel halide, or a combination thereof. The cobalt-containing raw material, for example, may be $CoSO_4$, $Co(OCOCH_3)_2 \cdot 4H_2O$, $Co(NO_3)_2 \cdot 6H_2O$, $CoSO_4 \cdot 7H_2O$, or a combination thereof.

The manganese-containing raw material, for example, may be $Mn_2O_3$, $MnO_2$, $Mn_3O_4$, $MnCO_3$, $Mn(NO_3)_2$, $MnSO_4 \cdot H_2O$, manganese acetate, manganese halide, or a combination thereof.

The Q metal-containing raw material may be an aluminum-containing raw material, and, for example, may be $Al_2O_3$, $Al(OH)_3$, $Al(NO_3)_3$, $Al_2(SO_4)_3$, $(HO)_2AlCH_3CO_2$, $HOAl(CH_3CO_2)_2$, $Al(CH_3CO_2)_3$, aluminum halide, or a combination thereof. However, with respect to Al, it may not be added to the transition metal aqueous solution, but may be added together with the lithium raw material in a sintering step to be described later. In addition, the Q metal-containing raw material may be acetic acid salts, carbonates, nitrates, sulfates, halides, sulfides, or oxides of metal Q.

An amount of each of the transition metal-containing raw materials added may be determined in consideration of a molar ratio of the transition metal in the positive electrode active material to be finally prepared.

The ammonium cationic complexing agent may include at least one compound selected from the group consisting of $NH_4OH$, $(NH_4)_2SO_4$, $NH_4NO_3$, $NH_4Cl$, $CH_3COONH_4$, and $NH_4CO_3$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

The basic compound may be at least one compound selected from the group consisting of NaOH, KOH, and $Ca(OH)_2$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

If the transition metal aqueous solution, the ammonium cationic complexing agent, and the basic compound are added to the reactor and stirred as described above, precursor particles in the form of a transition metal hydroxide are formed while the transition metals in the transition metal aqueous solution are co-precipitated.

In this case, the transition metal aqueous solution, the ammonium cationic complexing agent, and the basic compound are added in amounts such that a pH of a reaction solution is within a desired range.

If the precursor particles are formed by the above-described method, a transition metal precursor is obtained by separating the particles from the reaction solution. For example, after separating the transition metal precursor from the reaction solution by filtering the reaction solution, the separated transition metal precursor may be washed and dried to obtain a transition metal precursor. In this case, a process, such as grinding and/or classification, may be performed, if necessary.

Next, the transition metal precursor and a lithium raw material are mixed and then sintered to prepare a lithium transition metal oxide. In this case, the Q metal-containing raw material may be mixed together and sintered, if necessary. As the lithium raw material, lithium-containing sulfates, nitrates, acetic acid salts, carbonates, oxalates, citrates, halides, hydroxides, or oxyhydroxides may be used, and, for example, $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$, or a mixture thereof may be used.

The lithium raw material and the positive electrode active material precursor may be mixed so that a molar ratio of lithium (Li):total metals in the precursor is in a range of 1:1 to 1.2:1, preferably, 1.02:1 to 1.05:1. When the mixing ratio of the lithium raw material to the metal in the positive electrode active material precursor satisfies the above range, since a layered crystal structure of a positive electrode active material is well developed, the positive electrode active material having excellent capacity characteristics and structural stability may be prepared.

In an embodiment of the present invention, the sintering of the first step may be performed in a temperature range of 750° C. to 830° C., preferably, 750° C. to 780° C. for 10 hours to 17 hours in an oxygen atmosphere. That the sintering temperature and time are within the above ranges is desirable in terms of securing the structural stability through a sufficient reaction and simultaneously securing optimal electrochemical properties.

Second Step

In the present technology, $Ni^{2+}$ ions may be exposed even to the surface of the primary particle as well as the surface of the secondary particle through a process of washing the lithium transition metal oxide prepared in the first step with hot water of more than 90° C., preferably with hot water of 95° C. or higher to 150° C. or lower, and more preferably with hot water of 95° C. or higher and 130° C. or lower, and, through this, a NiO phase may be formed on the surfaces of both the secondary particle and the primary particle. Although the hot water temperature of more than 90° C. is advantageous for the formation of the NiO phase on the surface, it is desirable to set the temperature below 150° C. because excessively high temperature may cause damage to the surface of the active material to reduce the structural stability.

Specifically, the washing may be performed by a method of stirring the lithium transition metal oxide with hot water at 800 rpm using a magnetic bar in a stirrer.

A weight of the hot water used in the second step may be 1 to 3 times a weight of the lithium transition metal oxide, and it is desirable in that a Li by-product and Li ions on the surface of the oxide may be washed well in this case.

Also, the second step may be performed for 10 minutes to 30 minutes and, since excessive washing of Li on the surface may cause problems such as capacity degradation, it is desirable to wash for 30 minutes or less.

After the second step, a drying step may be performed at a temperature of 130° C. to 150° C. for 12 hours to 24 hours, but is not limited thereto.

In the present technology, the result of the EELS analysis of the particle surface of the lithium transition metal oxide after the second step satisfies Equation 1 above. Since $Ni^{2+}$ appears near 853 eV and $Ni^{3+}$ appears near 855.5 eV, amounts of the $Ni^{2+}$ and $Ni^{3+}$ may be compared by comparing the intensity of each peak.

Preferably, a value of the I (853 eV)/I (855.5 eV) may be in a range of 1 or more to 3 or less.

In an embodiment of the present invention, more $Ni^{2+}$ than $Ni^{3+}$ may be contained on the particle surface of the lithium transition metal oxide after the second step.

Positive Electrode Active Material

Next, a positive electrode active material according to the present technology will be described.

The positive electrode active material according to the present technology includes a lithium transition metal oxide containing 70 mol % or more of nickel based on the total number of moles of transition metals, wherein the result of the EELS analysis of the particle surface of the lithium transition metal oxide satisfies Equation 1 above. The positive electrode active material according to the present technology may be prepared according to the above-described preparation method of the present technology, and a description of each component may refer to contents of the preparation method.

In an embodiment of the present invention, the lithium transition metal oxide is a lithium transition metal oxide containing nickel, cobalt, and manganese and containing 70 mol % or more of nickel based on the total number of moles of total transition metals, and may preferably be a lithium nickel cobalt manganese oxide containing 80 mol % or more of nickel. When the amount of the nickel satisfies the above range, high capacity characteristics may be achieved.

Specifically, the lithium transition metal oxide may be represented by Formula 1 below.

[Formula 1]

$$Li_a[Ni_bCo_cMn_dQ_e]O_{2+f}$$

In Formula 1, a, b, c, d, e, and f are respectively $0.8 \le a \le 1.5$, $0.7 \le b < 1.0$, $0 < c \le 0.25$, $0 < d \le 0.25$, $0 \le e \le 0.1$, $b+c+d+e=1.0$, and $-0.1 \le f \le 1.0$, and Q is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

In an embodiment of the present invention, Q is at least one selected from the group consisting of Al, Mg, V, Ti, and Zr.

In an embodiment of the present invention, a in Formula 1 may satisfy $1.0 \le a \le 1.5$ or $1.0 \le a \le 1.2$.

In an embodiment of the present invention, b, c, d, and e in Formula 1 may satisfy $0.8 \le b < 1.0$, $0 < c \le 0.15$, $0 < d \le 0.15$, and $0 \le e \le 0.05$, respectively.

Also, $Ni^{2+}$ may be contained more than $Ni^{3+}$ on the particle surface of the lithium transition metal oxide.

Positive Electrode

Next, a positive electrode according to the present technology will be described.

The positive electrode according to the present technology includes a positive electrode active material layer including the positive electrode active material according to the present technology. Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon black such as acetylene black, Ketjen black, channel black, furnace black, lamp black, and thermal black; carbon-based materials such as carbon fibers and carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt %, preferably 1 wt % to 20 wt %, and more preferably 1 wt % to 10 wt % based on a total weight of the positive electrode active material layer.

The binder improves the adhesion between the positive electrode active material particles and the adhesion between the positive electrode active material and the positive electrode collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt %, preferably 1 wt % to 20 wt %, and more preferably 1 wt % to 10 wt % based on the total weight of the positive electrode active material layer.

The positive electrode may be prepared according to a typical method of preparing a positive electrode. For example, after a positive electrode slurry is prepared by mixing the positive electrode active material, the binder, and/or the conductive agent in a solvent and is coated on the positive electrode collector, the positive electrode may be prepared by drying and rolling the coated positive electrode collector. In this case, types and amounts of the positive electrode active material, the binder, and the conductive agent are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the slurry and manufacturing yield, and may allow to have viscosity that may provide excellent thickness uniformity during the subsequent coating for the preparation of the positive electrode.

As another method, the positive electrode may be prepared by casting the positive electrode slurry on a separate support and then laminating a film separated from the support on the positive electrode collector.

Lithium Secondary Battery

Next, a lithium secondary battery according to the present invention will be described.

The lithium secondary battery of the present technology includes the positive electrode according to the present technology. Specifically, the lithium secondary battery includes a positive electrode, a negative electrode disposed to face the positive electrode, a separator disposed between the positive electrode and the negative electrode, and an electrolyte, wherein the positive electrode is as described above. Also, the lithium secondary battery may further optionally include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer optionally includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used.

Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon black such as acetylene black, Ketjen black, channel black, furnace black, lamp black, and thermal black; carbon-based materials such as carbon fibers and carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt %, preferably 1 wt % to 20 wt %, and more preferably 1 wt % to 10 wt % based on a total weight of the negative electrode active material layer.

The binder improves the adhesion between the negative electrode active material particles and the adhesion between the negative electrode active material and the negative electrode collector. Specific examples of the binder may be polyvinylidene fluoride (PVDF), polyvinylidene fluoride-hexafluoropropylene copolymer (PVDF-CO-HFP), polyvinyl alcohol, polyacrylonitrile, carboxymethyl cellulose (CMC), starch, hydroxypropyl cellulose, regenerated polyvinylpyrrolidone, cellulose, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt %, preferably 1 wt % to 20 wt %, and more preferably 1 wt % to 10 wt % based on the total weight of the negative electrode active material layer.

The negative electrode active material layer, for example, may be prepared by coating a negative electrode slurry including the negative electrode active material and optionally the binder and the conductive agent on the negative electrode collector and drying the coated negative electrode collector, or may be prepared by casting the negative electrode slurry on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

Also, the electrolyte used in the present technology may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e. g., ethylm-ethyl carbonate, dimethyl carbonate, or diethyl carbonate) is more preferable. The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LIN (C2F_5SO_2)_2$, $LIN (CF_3SO_2)_2$, $LiCl$, $LiI$, or $LiB(C_2O_4)_2$ may be used as the lithium salt. The lithium salt may be used in a concentration range of 0.1 M to 5.0 M, preferably, 0.1 M to 3.0 M. If the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, an additive may be further included in the electrolyte. For example, as the additive, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, may be used alone or in a mixture thereof, but the present invention is not limited thereto. The additive may be included in an amount of 0.1 wt % to 10 wt %, preferably, 0.1 wt % to 5 wt % based on a total weight of the electrolyte.

As described above, since the lithium secondary battery including the positive electrode active material according to the present, technology stably exhibits excellent capacity characteristics, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains.

Examples and Comparative Examples: Preparation of Positive Electrode Active Materials Comparative Example 1

After 4 liters of distilled water were put in a co-precipitation reactor (capacity 20 L) and 100 mL of a 28 wt % aqueous ammonia solution was then added while the temperature was maintained at 50° C., a transition metal aqueous solution with a concentration of 3.2 mol/L, in which $NiSO_4$, $CoSO_4$, and $MnSO_4$ were mixed that molar such a ratio of nickel:cobalt:manganese was 0.8:0.1:0.1, and a 28 wt % aqueous ammonia solution were continuously added to the reactor at rates of 300 mL/hr and 42 mL/hr, respectively. Stirring was performed at an impeller speed of 400 rpm, and, in order to maintain a pH, a 40 wt % sodium hydroxide solution was added so that the pH was maintained at 9. Precursor particles were formed by performing a co-precipitation reaction for 10 hours. The precursor particles were separated, washed, and then dried in an oven at 130° C. to prepare a precursor.

The $Ni_{0.8}Co_{0.1}Mn_{0.1}(OH)_2$ precursor synthesized by the co-precipitation reaction was mixed with LiOH such that a molar ratio of Li/Me (Ni, Co, Mn) was 1.03, and heat-treated at 770° C. for 10 hours in an oxygen atmosphere to prepare a Li $[Ni_{0.8}Co_{0.1}Mn_{0.1}]O_2$ lithium composite transition metal oxide. Thereafter, 50 g of the prepared lithium transition metal oxide was put in a beaker and placed on a stirrer to wash it in water at 25° C. for 10 minutes. In this case, an amount of water was 50 g. After the washing, a positive electrode active material was completed by vacuum drying at 130° C. for 24 hours.

Comparative Example 2

A positive electrode active material was prepared in the same manner as in Comparative Example 1 except that the washing and drying processes were not performed.

Comparative Example 3

A positive electrode active material was prepared in the same manner as in Comparative Example 1 except that hot water of 70° C. was used instead of 25° C. water during the washing.

Example 1

A positive electrode active material was prepared in the same manner as in Comparative Example 1 except that hot water of 95° C. was used instead of 25° C. water during the washing.

Example 2

A positive electrode active material was prepared in the same manner as in Example 1 except that the washing process was performed for 30 minutes.

Experimental Example: EELS Analysis and Performance Evaluation

Experimental Example 1. EELS Analysis

Figure 1:
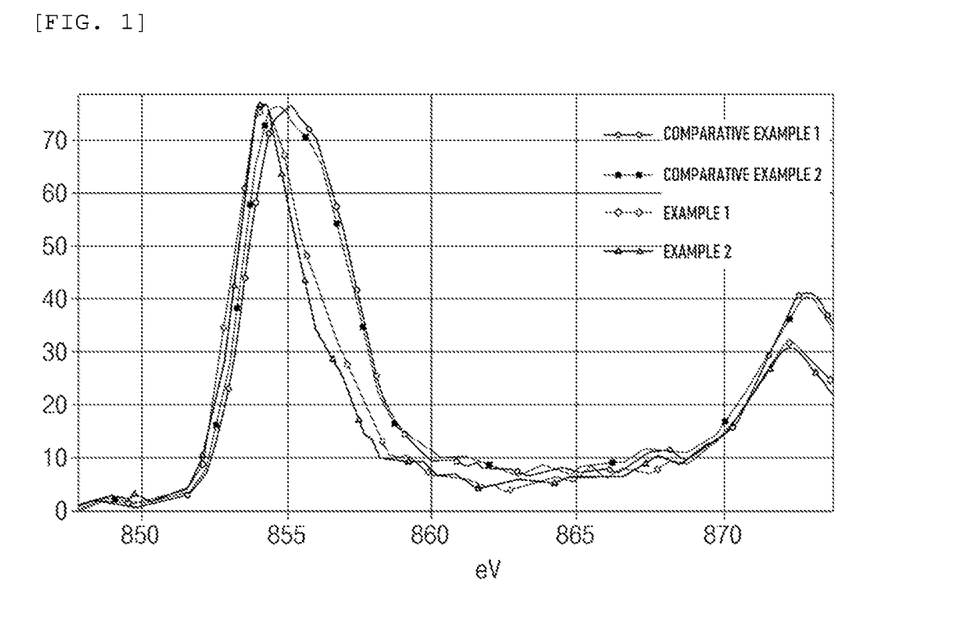
FIG. 1 is a graph illustrating EELS spectra of surfaces of positive electrode active materials prepared in Examples 1 and 2 and Comparative Examples 1 and 2 of the present disclosure.
Figure 2:
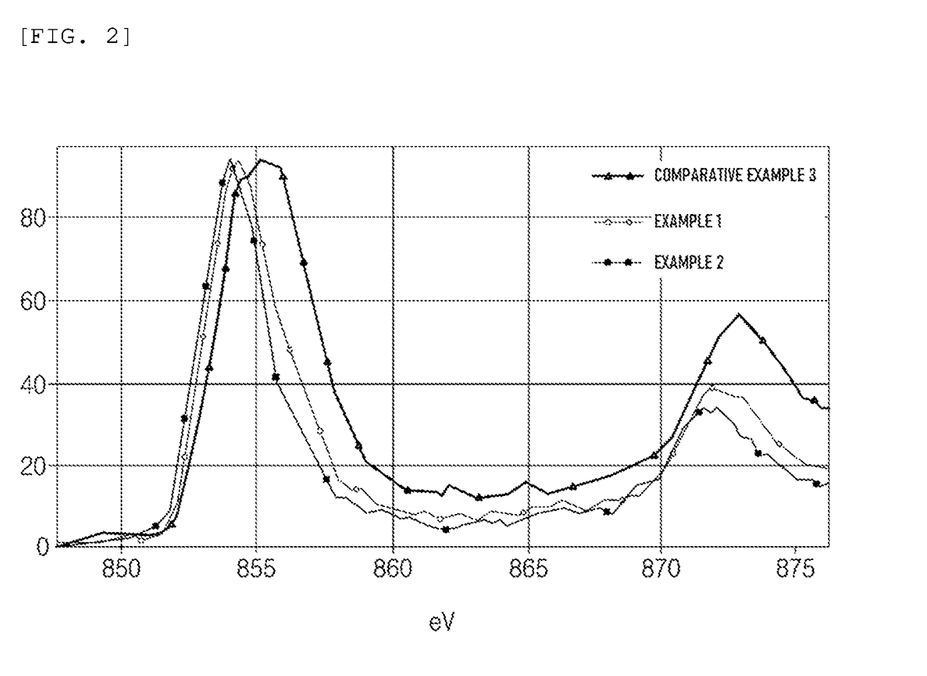
FIG. 2 is a graph illustrating EELS spectra of surfaces of positive electrode active materials prepared in Examples 1 and 2 and Comparative Example 3 of the present disclosure.

A spectrum was obtained for each of the positive electrode active materials prepared in the examples and the comparative examples by performing analysis from a particle surface to 100 nm in EELS mode using a TEM (FEI Ttitan G2 80-200 ChemiSTEM). The spectra obtained from Examples 1 and 2 and Comparative Examples 1 and 2 are illustrated in FIG. 1, and the spectra obtained from Examples 1 and 2 and Comparative Example 3 are illustrated in FIG. 2. After confirming a peak intensity appearing at 853 eV and a peak intensity appearing at 855.5 eV in the corresponding spectrum, results of substituting the peak intensities into Equation 1 are listed in Table 1 below.

Experimental Example 2. Continuous Charge Evaluation (1) Preparation of Lithium Secondary Battery Each of the positive electrode active materials prepared in the examples and the comparative examples, a conductive agent (carbon black), and a binder (PVDF) were mixed in N-methylpyrrolidone in a weight ratio of 96:2:2 to prepare a positive electrode slurry. One surface of an aluminum current collector was coated with the positive electrode slurry, dried at 100° C., and then rolled to prepare each positive electrode. A half-cell lithium secondary battery was prepared by preparing an electrode assembly by disposing a porous polyethylene separator between the positive electrode and a lithium metal negative electrode, disposing the electrode assembly in a battery case, and then injecting an electrolyte solution into the case. The electrolyte solution was prepared by dissolving 1 M $LiPF_6$ in a mixed organic solvent in which ethylene carbonate/dimethyl carbonate/diethyl carbonate were mixed in a volume ratio of 3:4:3.

(2) Measurement of Leakage Current Value

A leakage current value generated while each of the prepared lithium secondary batteries was charged at 0.1 C to 4.7 V at 50° C. and maintained in a constant voltage (CV) state for 200 hours was measured. A value of average leakage current, which was obtained by integrating the leakage current amount generated for 200 hours and then dividing by 200 hours, is listed in Table 1 below.

Experimental Example 3. Gas Generation Amount Evaluation

After each of the lithium secondary batteries prepared in Experimental Example 2 was charged at a state of charge (SOC) of 100% and then disassembled, two charged positive electrodes were put in a pouch together with 200 μl of the electrolyte solution and stored at 70° C. for 14 days. After the storage, an amount of gas, such as CO and $CO_2$, generated in the lithium secondary battery was measured and listed in Table 1 below.

TABLE 1

|  | Experimental Example 1 Equation 1 | Experimental Example 2 Average leakage current (mA) | Experimental Example 3 Gas generation amount (μl) |
| --- | --- | --- | --- |
| Comparative Example 1 | 0.75 | 0.237 | 601 |
| Comparative Example 2 | 0.58 | 0.121 | 845 |
| Comparative Example 3 | 0.80 | 0.119 | 496 |
| Example 1 | 1.71 | 0.042 | 231 |
| Example 2 | 1.89 | 0.026 | 205 |

From the results of Table 1, it may be confirmed that the average leakage current value and the amount of gas generated may be significantly reduced in a case in which the positive electrode active material that satisfied the value of Equation 1 of the present technology through the step of washing with hot water of more than 90° C. was used in the battery. Each of the examples and comparative examples was different only in washing conditions, and, particularly, when considering that the leakage current and gas generation amount were the lowest in Example 2 where the hot water washing time was increased to 30 minutes, and the results of Comparative Example 3 where the temperature of the hot water was 70° C. were poorer than the examples, it may be understood that this effect was an effect of suppressing the surface reactivity by adjusting the oxidation number of Ni on the surface of the positive electrode active material close to 2+ through the adjustment of the washing conditions.

The invention claimed is:

1. A method of preparing a positive electrode active material for a lithium secondary battery, comprising:
 preparing a lithium transition metal oxide by mixing a lithium raw material and a transition metal precursor containing 70 mol % or more of nickel based on a total number of moles of transition metals to form a mixture, and sintering the mixture to form the lithium transition metal oxide; and
 washing the lithium transition metal oxide with hot water of 95° C. or higher and 130° C. or lower,
 wherein the sintering is performed at 750° C. to 830° C.,
 wherein the washing is performed for 10 minutes to 30 minutes,
 wherein the lithium metal oxide is represented by a following Formula 1:

$Li_a[Ni_bCo_cMn_dQ_e]O_{2+f}$ (1), wherein $1.0 \leq a \leq 1.2$, $0.7 < b < 1.0$, $0 < c \leq 0.15$, $0 < d \leq 0.15$, $0 \leq e \leq 0.05$, $b+c+d+e=1.0$, $-0.1 \leq f \leq 1.0$, and Q is at least one of W, Cu, Fe, V, Cr, Ti, Zr, Zn, Al, In, Ta, Y, La, Sr, Ga, Sc, Gd, Sm, Ca, Ce, Nb, Mg, B, or Mo, and wherein, immediately after the washing and a subsequent drying of the lithium transition metal oxide, a result of EELS analysis of a particle surface of the lithium transition metal oxide satisfies a following Equation 1:

$1 \leq I(853\ eV)/I(855.5\ eV) \leq 1.89$ (1), wherein

I (853 eV) is a peak intensity appearing near 853 eV, and I (855.5 eV) is a peak intensity appearing near 855.5 eV.

2. The method of claim 1, wherein more $Ni^{2+}$ than $Ni^{3+}$ is contained on the particle surface of the lithium transition metal oxide after the washing.

3. The method of claim 1, wherein a weight of the hot water used in the washing is from 1 to 3 times a weight of the lithium transition metal oxide.

* * * * *